(12) United States Patent
Hu

(10) Patent No.: US 12,395,098 B2
(45) Date of Patent: Aug. 19, 2025

(54) BIDIRECTIONAL INVERTER CIRCUIT AND BIDIRECTIONAL INVERTER

(71) Applicant: Huizhou RoyPow Technology Co., Ltd., Guangdong Province (CN)

(72) Inventor: Yanshen Hu, Guangdong Province (CN)

(73) Assignee: HUIZHOU ROYPOW TECHNOLOGY CO., LTD., Guangdong Province (CN)

( * ) Notice: Subject to any disclaimer, the term of this patent is extended or adjusted under 35 U.S.C. 154(b) by 95 days.

(21) Appl. No.: 18/227,265

(22) Filed: Jul. 27, 2023

(65) Prior Publication Data

US 2024/0204691 A1    Jun. 20, 2024

(30) Foreign Application Priority Data

Dec. 14, 2022    (CN) .......................... 202211602394.9

(51) Int. Cl.
| | |
|---|---|
| *H02M 1/12* | (2006.01) |
| *H02M 1/00* | (2006.01) |
| *H02M 1/088* | (2006.01) |
| *H02M 7/487* | (2007.01) |
| *H02M 7/797* | (2006.01) |

(52) U.S. Cl.
CPC ......... *H02M 7/797* (2013.01); *H02M 1/0009* (2021.05); *H02M 1/088* (2013.01); *H02M 1/126* (2013.01); *H02M 7/487* (2013.01)

(58) Field of Classification Search
CPC .............................. H02M 1/126; H02M 7/487
See application file for complete search history.

(56) References Cited

U.S. PATENT DOCUMENTS

| | | | |
|---|---|---|---|
| 10,199,957 B1* | 2/2019 | Prakash | H02M 7/5395 |
| 2015/0180350 A1* | 6/2015 | Huang | H02M 3/33584 |
| | | | 307/66 |

FOREIGN PATENT DOCUMENTS

| | | |
|---|---|---|
| CN | 104333248 A | 2/2015 |
| CN | 105024570 A | 11/2015 |
| CN | 107294129 A | 10/2017 |
| CN | 207743895 U | 8/2018 |
| EP | 0411138 A1 | 2/1991 |
| JP | 2004080891 A | 3/2004 |

* cited by examiner

*Primary Examiner* — Gary A Nash
(74) *Attorney, Agent, or Firm* — CANTOR COLBURN LLP

(57) ABSTRACT

A bidirectional inverter circuit and a bidirectional inverter. The bidirectional inverter circuit includes a positive DC bus, a negative DC bus, M bidirectional switch networks and M AC buses, and the M bidirectional switch networks include m1 first type of bidirectional switch network, m2 second type of bidirectional switch network and m3 third type of bidirectional switch network. When the bidirectional inverter circuit adopts an inverting coupling transformer to perform a bidirectional power conversion, the switch bridge arm can realize the formation of a current loop, which enables a body diode of a corresponding power switch to be switched on before the corresponding power switch of the switch bridge arm being switched on, thereby a power consumption for reverse recovery of the body diode of the corresponding power switch can be reduced, realizing a zero-voltage soft switching, and thus a switch power consumption of the power switch is reduced.

18 Claims, 11 Drawing Sheets

BIDIRECTIONAL INVERTER CIRCUIT AND BIDIRECTIONAL INVERTER

CROSS-REFERENCE TO RELATED APPLICATION

Pursuant to 35 U.S.C. § 119 and the Paris Convention, this application claims the benefit of Chinese Patent Application No. 202211602394.9 filed on Dec. 14, 2022, the content of which is incorporated herein by reference.

TECHNICAL FIELD

The present application relates to the field of power electronics technology, and in particular, to a bidirectional inverter circuit and a bidirectional inverter.

BACKGROUND

The statements provided herein are merely background information related to the present application, and do not necessarily constitute any prior arts. Bidirectional inverter circuit is used to realize a power conversion of bidirectional direct current-alternating current (DC/AC), and is mainly constituted by a bidirectional DC/AC conversion circuit. The bidirectional DC/AC circuit topology usually uses a bidirectional full-bridge inverter circuit. Since the bidirectional full-bridge inverter circuit has used four power switches as well as body diodes of the four power switches, the bidirectional full-bridge inverter circuit is also called a bidirectional H4 topology, which has advantages of simple circuit structure and mature modulation mode, and has been widely used in industrial and civil bidirectional inverters.

When the bidirectional H4 topology adopts the traditional bipolar high-frequency sine wave pulse width modulation (SPWM) method, the four power switches are all operated in a high-frequency hard switch status, and a power consumption of the switches is relatively large, especially that a power consumption for reverse recovery of the body diode is relatively large, resulting in lower conversion efficiency. To improve the conversion efficiency, a unipolar or mixed modulation mode may also be used, but this unipolar or mixed modulation mode will cause higher common mode interference and higher leakage current.

SUMMARY

An objective of the present application is to provide a bidirectional inverter circuit and a bidirectional inverter, aiming at solving the problem of high switch power consumption in traditional bidirectional inverter circuits.

In accordance with a first aspect of embodiments of the present application, a bidirectional inverter circuit is provided, including a positive DC bus, a negative DC bus, M bidirectional switch networks and M AC buses, where M≥2;

The M bidirectional switch networks include m1 first type of bidirectional switch network, m2 second type of bidirectional switch network, and m3 third type of bidirectional switch network, and each of the first type of bidirectional switch networks includes an inverting coupling transformer, a filter inductor and a plurality of switch bridge arms, each of the second type of bidirectional switch networks includes a filter inductor and a switch bridge arm, each of the third type of bidirectional switch networks includes a switch bridge arm, where m1+m2+m3=M, and m1≥1.

In each of the first type of bidirectional switch networks, positive DC ends of the plurality of switch bridge arms are respectively connected to the positive DC bus, negative DC ends of the plurality of switch bridge arms are respectively connected to the negative DC bus, and bridge-arm midpoints of the plurality of switch bridge arms are respectively connected to one winding of the inverting coupling transformer, a midpoint of the inverting coupling transformer is connected to a first end of the filter inductor, and a second end of the filter inductor is connected to one of the AC buses.

If m2≥1, in each of the second type of bidirectional switch networks, a positive DC end, a negative DC end and a bridge-arm midpoint of the switch bridge arm are respectively connected to the positive DC bus, the negative DC bus and a first end of the filter inductor in one-to-one correspondence, and a second end of the filter inductor is connected to one of the AC buses.

If m3≥1, in each of the third type of bidirectional switch networks, a positive DC end, a negative DC end and a bridge-arm midpoint of the switch bridge arm are respectively connected to the positive DC bus, the negative DC bus and one of the AC buses in a one-to-one correspondence.

Optionally, the bidirectional inverter circuit also includes a controller.

The controller is respectively connected to the positive DC bus, the negative DC bus, the AC buses and the M bidirectional switch networks. The controller is configured to output corresponding driving voltages to each of the switch bridge arms according to a driving instruction and electrical sampling signals of the positive DC bus, the negative DC bus and the AC buses, to drive the M bidirectional switch networks to perform a rectification conversion or an AC conversion, and correspondingly output an AC signal or a DC signal of a preset magnitude Optionally, the controller includes: a first voltage sampling circuit, a second voltage sampling circuit, a current sampling circuit, a first comparison circuit, a second comparison circuit, a gate circuit, a logic operation and wave-sending circuit and a drive circuit.

The first voltage sampling circuit is connected to the positive DC bus and configured to perform a voltage sampling on the positive DC bus to generate a first voltage sampling signal.

The second voltage sampling circuit is connected to the AC bus and configured to perform a voltage sampling on the AC bus to generate a second voltage sampling signal.

The current sampling circuit is connected to the AC bus and configured to perform a current sampling on the AC bus to generate a current sampling signal.

The first comparison circuit is respectively connected to the first voltage sampling circuit and the current sampling circuit. The first comparison circuit is configured to perform a comparison on the first voltage signal and a first reference voltage signal, and generate a first feedback signal according to a comparison result and the current sampling signal.

The second comparison circuit is respectively connected to the second voltage sampling circuit and the current sampling circuit. The second comparison circuit is configured to perform a comparison on the second voltage signal and a second reference voltage signal, and generate a second feedback signal according to a comparison result and the current sampling signal.

The gate circuit is respectively connected to the first comparison circuit and the second comparison circuit, and is configured to generate a control signal according to the driving instruction, the first feedback signal and the second feedback signal.

The logic operation and wave-sending circuit is connected to the gate circuit, and is configured to generate a PWM driving signal according to the control signal.

The drive circuit is respectively connected to the logic operation and wave circuit and each switch bridge arm of the bidirectional switch network. The drive circuit is configured to generate a driving voltage of a corresponding voltage magnitude according to the PWM driving signal to each of the switch bridge arms, to drive the bidirectional switch networks to perform the rectification conversion or the AC conversion, and correspondingly output the AC signal or the DC signal of the preset magnitude.

Optionally, when m1≥3, each of m1 filter inductors is connected to one of the AC buses, and each of the filter inductors is also connected to a midpoint of one inverting coupling transformer.

Or alternatively, the m1 filter inductors are divided into multiple groups and each of the multiple groups is connected to one of the AC buses, each group of filter inductors includes at least one filter inductor and the at least one filter inductor is connected to the same AC bus, each of the filter inductors is also connected to the midpoint of one inverting coupling transformer.

Optionally, in the second type of bidirectional switch network or the third type of bidirectional switch network, the switch bridge arm includes two insulated gate bipolar transistors connected in series and two body diodes connected in anti-parallel to the two insulated gate bipolar transistors, respectively.

The two insulated gate bipolar transistors are connected in series and connected between the positive DC bus and the negative DC bus, and a connection node of the two insulated gate bipolar transistors is connected to one of the AC buses.

Or alternatively, the two insulated gate bipolar transistors are connected in series and connected between the positive DC bus and the negative DC bus, and the connection node of the two insulated gate bipolar transistors is connected to the first end of the filter inductor, and the second end of the filter inductor is connected to one of the AC buses.

Optionally, in the second type of bidirectional switch network or the third type of bidirectional switch network, the switch bridge arm includes two filter capacitors connected in series.

The two filter capacitors are connected in series and connected between the positive DC bus and the negative DC bus, and a connection node of the two filter capacitors is connected to one of the AC buses.

Or alternatively, the two filter capacitors are connected in series and connected between the positive DC bus and the negative DC bus, the connection node of the two filter capacitors is connected to the first end of the filter inductor, and the second end of the filter inductor is connected to one of the AC buses.

Optionally, the filter inductor is an equivalent leakage inductance of the inverting coupling transformer.

Optionally, when m1≥2;

A persistent current switch for following current is connected in parallel between the first ends of the filter inductors of every two adjacent first type of bidirectional switch networks.

The persistent current switch includes a first persistent current switch and a second persistent current switch connected in series, and two third body diodes connected in anti-parallel to the first persistent current switch and the second persistent current switch respectively.

Optionally, in the first type of bidirectional switch network, the driving signals received by upper and lower bridge arms of the switch bridge arm have opposite levels and the switch bridge arm has a dead time of a preset size, and a conduction condition of the switch bridge arm is that:

D>0.5 and Φ<(1−D), or alternatively, D<0.5 and Φ<D.

Where, D represents an operation duty cycle of the upper bridge arm or the lower bridge arm of each switch bridge arm, Φ represents an operation phase difference in each switch bridge arm, and the operation phase difference is greater than the dead time preset of each switch bridge arm.

In accordance with a second aspect of the embodiments of the present application, a bidirectional inverter is provided, including the bidirectional inverter circuit as above-mentioned.

Compared with conventional arts, the embodiments of the present application have beneficial effect that: when the above-mentioned bidirectional inverter circuit adopts the inverting coupling transformer T to perform bidirectional power conversion, a current loop can be formed by the switch bridge arm 1, and the body diode of a corresponding power switch is enabled to be switched on before the corresponding power switch of the switch bridge arm 1 is switched on, thereby the power consumption for reverse recovery of the body diode of the corresponding power switch is reduced, which realizes a zero-voltage soft switching, and thus the switch power consumption of the power switch is reduced. Meanwhile, a multi-level output can be realized at the midpoint of the inverting coupling transformer T, thereby the switch power consumption of the power switch can be further reduced.

DETAILED DESCRIPTION OF EMBODIMENTS

In order to illustrate the technical problems to be solved, technical solutions and beneficial effects of the present application more clearly, the present application will be further described in detail below with reference to the drawings and embodiments. It should be understood that the specific embodiments described here are only used to explain the present application, and are not intended to limit the present application.

In addition, the terms "first" and "second" are used for descriptive purposes only, and should not be interpreted as indicating or implying relative importance or implicitly specifying the quantity of indicated technical features. Thus, a feature defined as "first" and "second" may explicitly or implicitly include one or more of these features. In the description of the present application, the phrase "a/the plurality of" means two or more, unless otherwise specifically defined.

A first aspect of the embodiments of the present application provides a bidirectional inverter circuit, which is configured to realizes an inverter conversion from a direct current (DC) to an alternating current (AC) and a rectification conversion from the AC to the DC.

Figure 1:
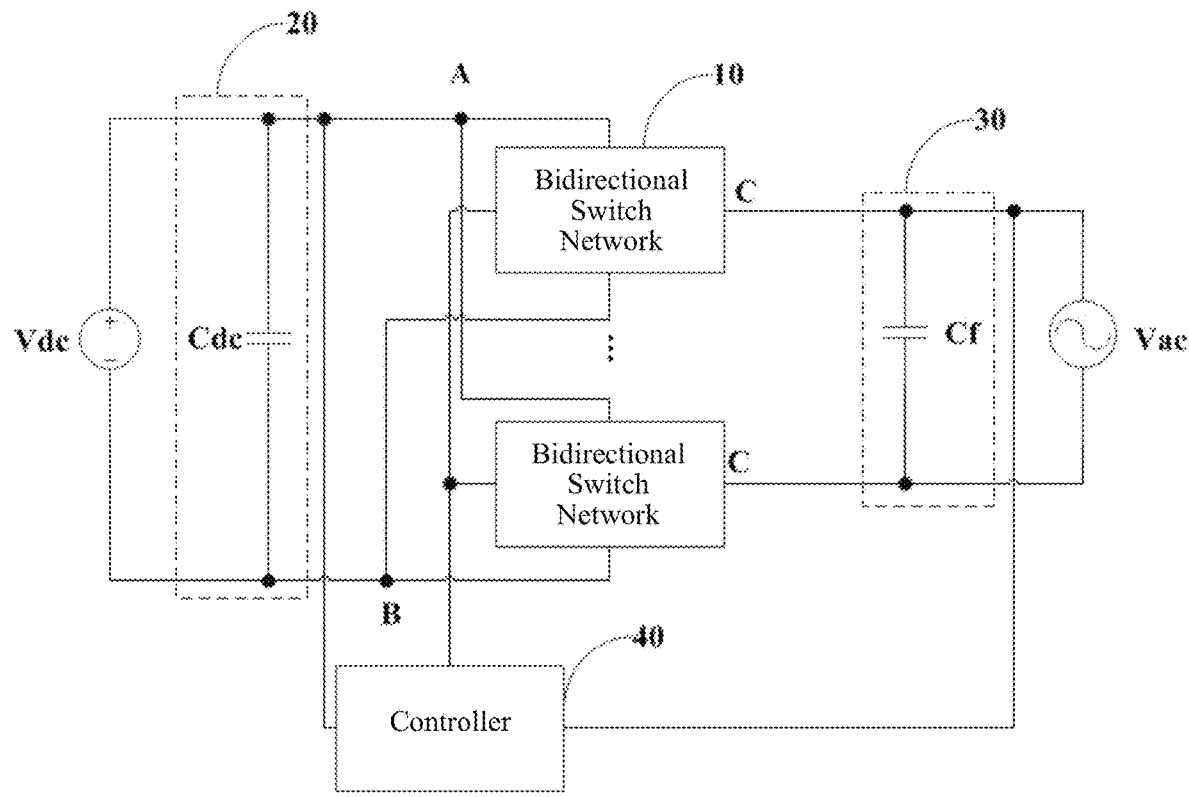
FIG. 1 is a first structural schematic diagram of a bidirectional inverter circuit provided by an embodiment of the present application.

In the present application, as shown in FIG. 1, FIG. 1 is a first schematic structural diagram of the bidirectional inverter circuit provided by an embodiment of the present application. In this embodiment, the bidirectional inverter circuit includes a positive DC bus A, a negative DC bus B, M bidirectional switch networks 10 and M AC buses C, where M>2. The positive DC bus A and negative DC bus B are configured to input and output a DC power supply Vdc, and the M AC buses C are configured to input and output multi-phase AC power supply, such as two-phase AC power supply Vac or a three-phase AC power supply Va, Vb, Vc, etc. The type of AC power supply is not specifically limited herein.

Each bidirectional switch network 10 is connected between the positive DC bus A, the negative DC bus B and one AC bus C, and is configured to receive corresponding driving voltages to implement bidirectional power conversion between the DC power supply and the AC power supply of this phase.

As shown in FIG. 1, the bidirectional inverter circuit also includes a DC filter capacitor circuit 20 and M AC filter capacitor circuits 30 for realizing a filtering operation of the DC power supply and the AC power supply. The DC filter capacitor circuit 20 is connected between the positive DC bus A and the negative DC bus B, an AC filter capacitor circuit 30 is connected between every two AC buses C, or an AC filter capacitor circuit 30 is connected between each AC bus C and a neutral line, the specific arrangement of the AC filter capacitor circuit 30 is determined according to an actual AC output. The DC filter capacitor circuit 20 includes a first filter capacitor Cdc, and the AC filter capacitor circuit includes a second filter capacitor Cf.

Figure 2:
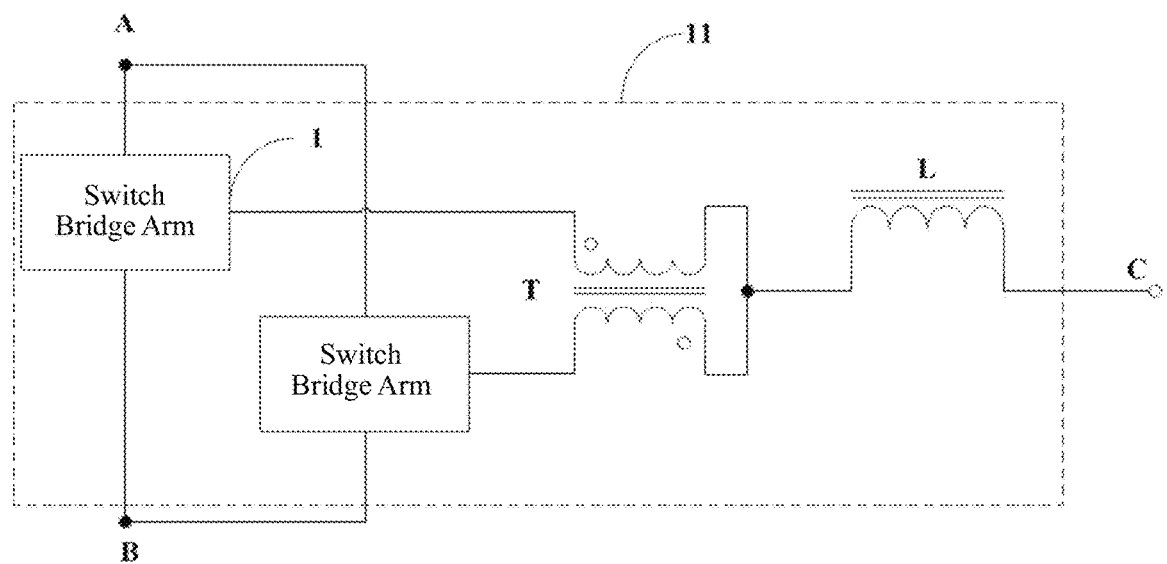
FIG. 2 is a first structure schematic diagram of a first type of bidirectional switch network in the bidirectional inverter circuit shown in FIG. 1.
Figure 3:
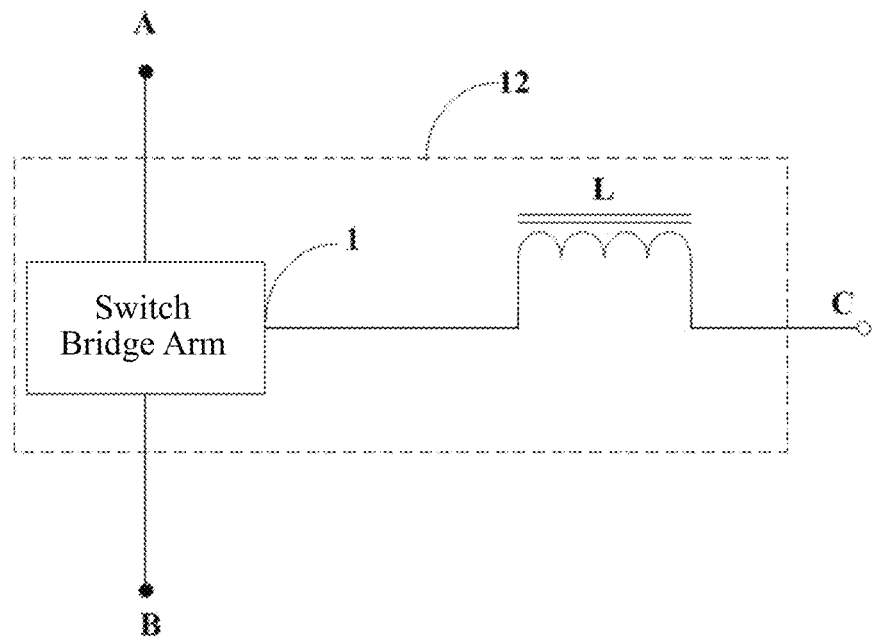
FIG. 3 is a schematic structural diagram of a second type of bidirectional switch network in the bidirectional inverter circuit shown in FIG. 1.
Figure 4:
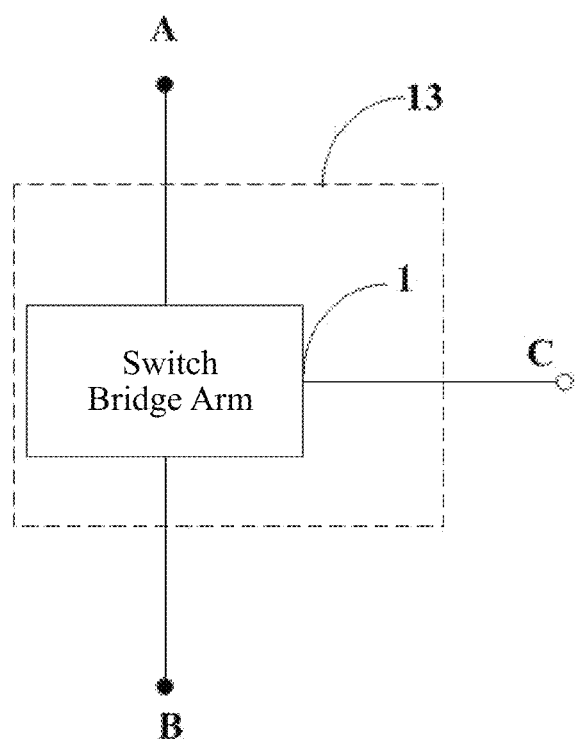
FIG. 4 is a schematic structural diagram of a third type of bidirectional switch network in the bidirectional inverter circuit shown in FIG. 1.

In the present application, as shown in FIGS. 2 to 4, the M bidirectional switch networks 10 may optionally be provided with three different types of bidirectional switch networks 10. The M bidirectional switch networks 10 include at least one first type of bidirectional switch network 11, that is, the M bidirectional switch networks 10 includes m1 first type of bidirectional switch networks 11, m2 second type of bidirectional switch networks 12, and m3 third type of bidirectional switch networks 13. The first type of bidirectional switch network 11 includes an inverting coupling transformer T, a filter inductor L and a plurality of switch bridge arms 1. The second type of bidirectional switch network 12 includes a filter inductor L and a switch bridge arm 1. The third type of bidirectional switch network 13 includes a switch bridge arm 1, m1+m2+m3=M, m1≥1, that is, the first type of bidirectional switch network 11 includes at least two switch bridge arms 1, such as a first switch bridge arm 101 and a second switch bridge arm 102.

In each first type of bidirectional switch network 11, a positive DC end and a negative DC end of the switch bridge arm 1 are respectively connected to the positive DC bus A and the negative DC bus B in one-to-one correspondence. Bridge arm midpoints of each switch bridge arm 1 are respectively connected with a winding of the inverting coupling transformer T, a midpoint of the inverting coupling transformer T is connected to a first end of the filter inductor L, and a second end of the filter inductor L is connected to an AC bus C, that is, multiple switch bridge arms 1 are grouped and then connected to multiple windings of the inverting coupling transformer T, respectively. Each group includes at least one switch arm 1, and when each group includes a plurality of switch arms 1, the plurality of switch arms 1 are connected in parallel to the windings of the inverting transformer T to form a multi-phase non-interleaved parallel bidirectional inverter circuit.

All bidirectional switch networks 10 may be arranged as the first type of bidirectional switch network 11, or alternatively, multiple bidirectional switch networks 10 may be selected to be arranged as the first type of bidirectional switch network 11, and the remaining bidirectional switch networks 10 may be optionally arranged as the second type of bidirectional switch network 12 or the third type of bidirectional switch network 13. That is, if m2≥1, in each second type of bidirectional switch network 12, the positive DC end, the negative DC end and the bridge arm midpoint of the switch bridge arm 1 are respectively connected to the positive DC bus A, the negative DC bus B, and the first end of the filter inductor L in one-to-one correspondence, and the second end of the filter inductor L is connected to an AC bus C.

And if m3≥1, in each third type of bidirectional switch network 13, the positive DC end, the negative DC end and the bridge-arm midpoint 1 are respectively connected to the positive DC bus A, the negative DC bus B and an AC bus C in a one-to-one correspondence. The M bidirectional switch networks 10 may be flexibly combined with different circuit structures, thereby the adaptability of the bidirectional inverter circuit is improved.

Figure 5:
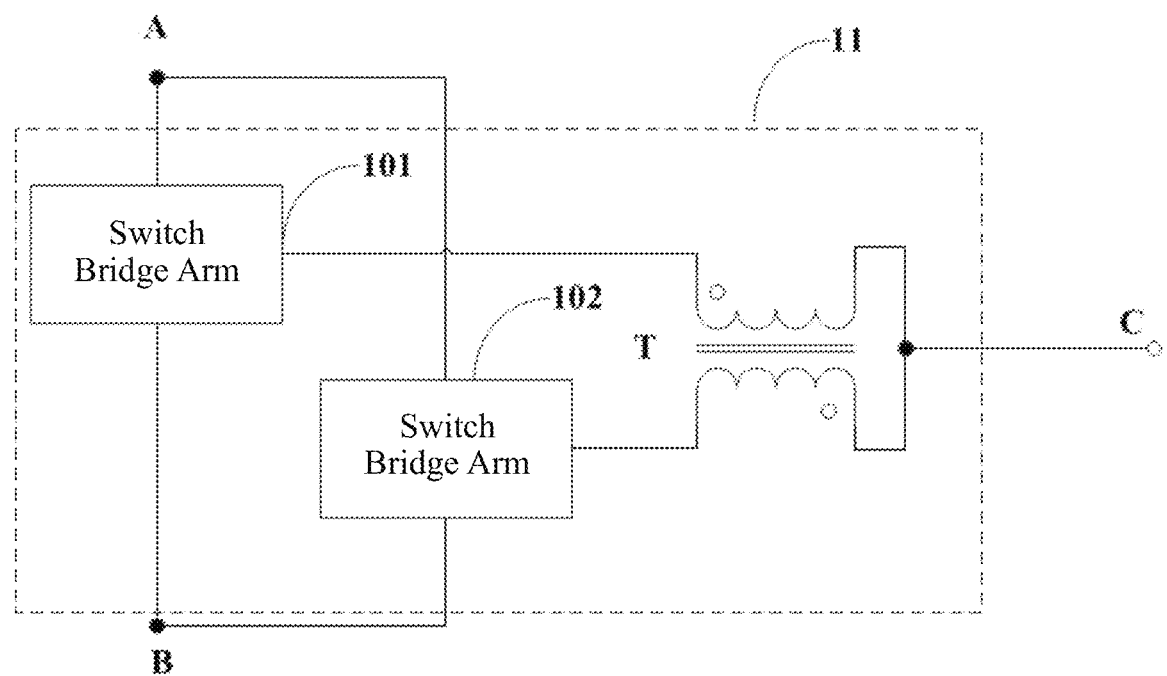
FIG. 5 is a second structural schematic diagram of the first type of bidirectional switch network in the bidirectional inverter circuit shown in FIG. 1.

Optionally, the filter inductor L in the bidirectional switch network 10 may also be equivalent leakage inductance of the inverting coupling transformer T, as shown in FIG. 5, correspondingly, the first type of bidirectional switch network 11 may include: a plurality of switch bridge arms 1 and the inverting coupling transformer T, in this way, the size of the bidirectional inverter circuit can be reduced.

In this embodiment, the switch bridge arm 1 may be constituted by a power switch, and the power switch may be a high frequency switch or a power frequency switch. Specifically, the power switch may be a fully-controlled power semiconductor device, such as a metal-oxide-semiconductor field-effect transistor (MOSFET), an insulated gate bipolar transistor (IGBT), or a third-generation semiconductor wide bandgap (WBG) power device, such as a silicon carbide (SiC) MOSFET, a gallium nitride (GaN) MOSFET, etc.

Optionally, as shown in FIG. 1, the bidirectional inverter circuit also includes a controller 40.

The controller 40 is connected to the positive DC bus A, the negative DC bus B, the AC buses C and M bidirectional switch networks 10 respectively. The controller 40 is configured to output, according to a driving instruction and electrical sampling signals from the positive DC bus A, the negative DC bus B and the AC buses C, a corresponding driving voltage to each switch bridge arm 1 to drive the M bidirectional switch networks 10 to perform a rectification conversion or an AC conversion, and correspondingly output an AC signal or a DC signal of a preset magnitude.

In the present application, each switch bridge arm 1 of the first type of bidirectional switch network 11 is configured to receive the driving voltage output by the controller 40 to implement a bidirectional inverter conversion. A path from the DC power supply to the AC power supply is that: the DC power supply Vdc is filtered by the DC filter capacitor circuit 20, then an electric energy conversion is performed on the filtered DC power supply through at least two switch bridge arms 1 inside the bidirectional switch network 10 to output two high-frequency square waves, and then the two high-frequency square wave outputs, via the two windings of the inverting coupling transformer T respectively, are entered into the filter inductor L, and then, via the AC filter capacitor circuit 30, a sine wave is provided to the AC power supply.

After internal logic processing and control, the controller 40 is configure to output an appropriate driving voltage to an internal power switch of the switch bridge arm 1 to operate at a sine pulse-width-modulation (SPWM) high-frequency switching, and to finally provide a stable AC sine-wave voltage or current to the AC power supply Vac. Conversely, a power flow (rectification) path from the AC power supply to the DC power supply is similar to the path from the DC power supply to the AC power supply, both have the same working principle, which will not be repeated here. Thus, the bidirectional inverter circuit is able to realize a bidirectional electric energy conversion.

The controller 40 is configured to determine an input condition and a load condition, and control the high-frequency switching operation of the power switch by sampling the AC and DC output voltage and/or current, thereby realizing a closed-loop operation process. The controller 40 may be built using discrete electronic components, or may be designed and used as an application-specific integrated circuit, such as an analog control chip, a single-chip microcomputer (MCU) programmed through software, a digital signal processor (DSP) or a programmable logic device (FPGA/CPLD), etc. The bidirectional inverter circuit may be either discrete or integrated, or integrated into the controller 40 to form a large-scale hybrid integrated circuit. This highly integrated design of the controller 40 can further reduce the size of the bidirectional inverter.

Figure 6:
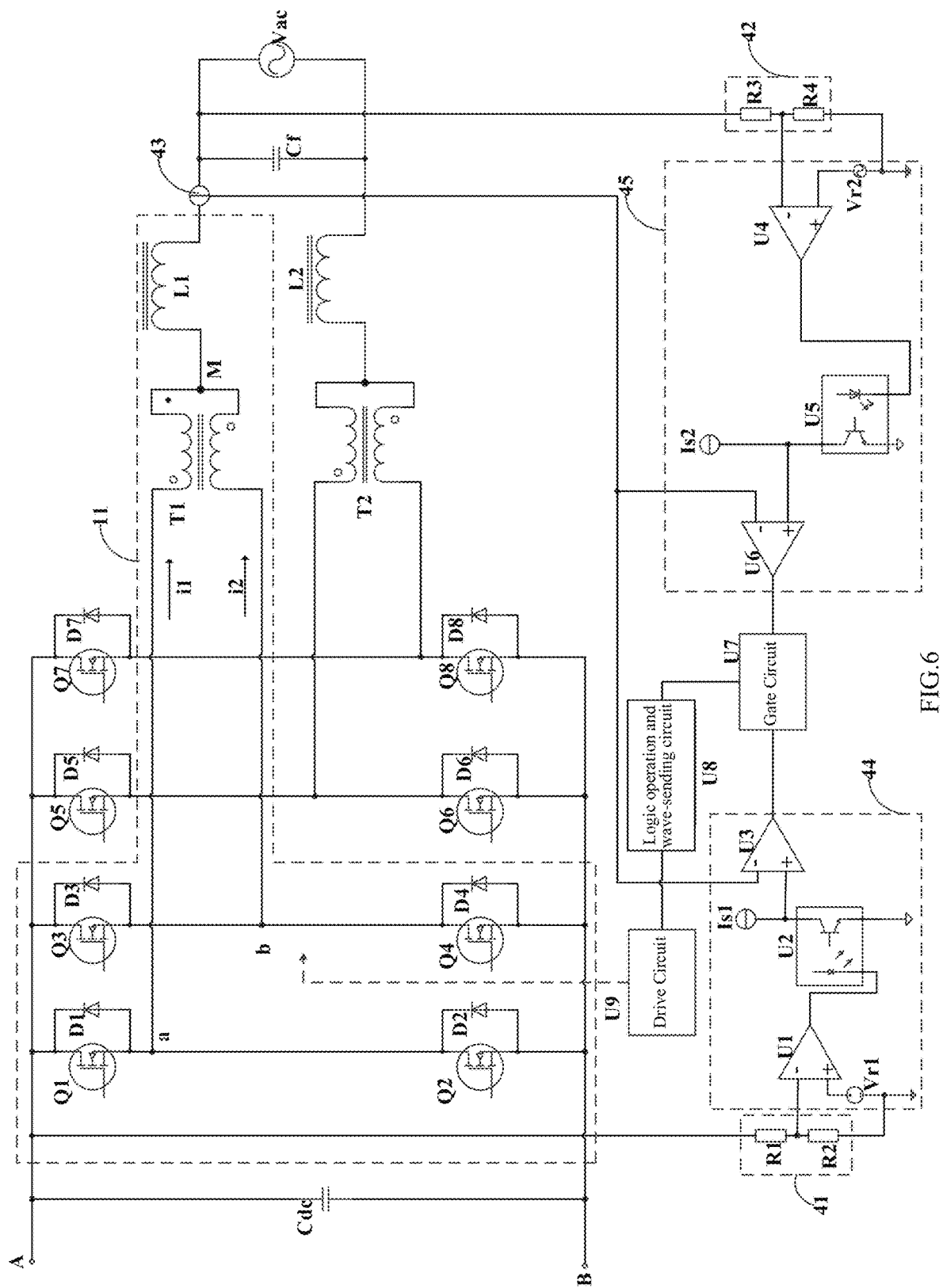
FIG. 6 is a second structural schematic diagram of the bidirectional inverter circuit provided by an embodiment of the present application.

Optionally, as shown in FIG. 6, the controller 40 includes: a first voltage sampling circuit 41, a second voltage sampling circuit 42, a current sampling circuit 43, a first comparison circuit 44, a second comparison circuit 45, a gate circuit U7, a logic operation and wave-sending circuit U8, and a drive circuit U9.

The first voltage sampling circuit 41 is connected to the positive DC bus A and configured to perform a voltage sampling on the positive DC bus A to generate a first voltage sampling signal;

The second voltage sampling circuit 42 is connected to the AC bus C and configured to perform a voltage sampling on the AC bus C to generate a second voltage sampling signal;

The current sampling circuit 43 is connected to the AC bus C and configured to perform a current sampling on the AC bus C to generate a current sampling signal;

The first comparison circuit 44 is respectively connected with the first voltage sampling circuit 41 and the current sampling circuit 43. The first comparison circuit 44 is configured to compare the first voltage sampling signal with a first reference voltage signal, and generate a first feedback signal according to a comparison result and the current sampling signal;

The second comparison circuit 45 is respectively connected with the second voltage sampling circuit 42 and the current sampling circuit 43. The second comparison circuit 45 is configured to compare the second voltage sampling signal with a second reference voltage signal, and generate a second feedback signal according to a comparison result and the current sampling signal;

The gate circuit U7 is respectively connected with the first comparison circuit 44 and the second comparison circuit 45. The gate circuit U7 is configured to generate a control signal according to a driving instruction, the first feedback signal and the second feedback signal;

The logic operation and wave-sending circuit U8 is connected to the gate circuit U7 and configured to generate a PWM driving signal according to the control signal;

The drive circuit U9 is respectively connected with the logic operation and wave-sending circuit U8 and the switch bridge arm 1 of each bidirectional switch network 10. The drive circuit U9 is configured to generate a corresponding driving voltage to each switch bridge arm 1 according to the PWM driving signal, to drive the bidirectional switch network 10 to perform the rectification conversion or AC conversion, and correspondingly output an AC signal or a DC signal of a preset magnitude.

In an embodiment, the first voltage sampling circuit 41 is constituted by a first resistor R1 and a second resistor R2. The first voltage sampling circuit 41 is configured to sample a voltage of the positive DC bus A through a resistive subdivision, and the generated first voltage sampling signal is output to the first comparison circuit 44. The first comparison circuit 44 is constituted by a first optocoupler U2, a first current source Is1, a DC reference voltage source Vr1, a first voltage error amplifier U1, and a first current error amplifier U3. The first voltage sampling signal is input to an inverting input of the first voltage error amplifier U1, the DC reference voltage source Vr1 is connected to a non-inverting input of the first voltage error amplifier U1, an output of the first voltage error amplifier U1 is connected to a cathode of a diode at a primary side of the first optocoupler U2, and an anode of the first optocoupler U2 is connected to an internal voltage source (not shown in the figure). An emitter of a transistor at a secondary side of the first optocoupler U2 is grounded, and a collector of the transistor at the secondary side of the first optocoupler U2 is connected to the first current source Is1 and a non-inverting input of the first current error amplifier U3. Optionally, the AC and DC sides may share a same current sampling signal, and the current sampling circuit 43 may optionally be a current sensor, a current transformer, or a resistor, and so on. The current sampling signal is output to an inverting input of the first current error amplifier U3, and an output of the first current error amplifier U3 is connected to a first input of the gate circuit U7.

The second voltage sampling circuit 42 is constituted by a third resistor R3 and a fourth resistor R4. The third resistor R3 and the fourth resistor R4 are configured to sample a voltage at the AC side to generate a second voltage sampling signal. The second comparison circuit 45 is constituted by an AC reference voltage source Vr2, a second voltage error amplifier U4, a second current error amplifier U6, a second optocoupler U5 and a second current source Is2. The second voltage sampling signal is output to an inverting input of the second voltage error amplifier U4, and a non-inverting input of the second voltage error amplifier U4 is connected to the AC reference voltage source Vr2. An output of the second voltage error amplifier U4 is connected to a cathode of a diode at a primary side of the second optocoupler U5, and an anode of the second optocoupler U5 is connected to an internal voltage source (not shown in the figure), an emitter of a transistor at a secondary side of the second optocoupler U5 is grounded, and a collector of the transistor at a secondary side of the second optocoupler U5 is connected to the second current source Is2 and an non-inverting input of the second current error amplifier U6. The current sampling signal is output to an inverting input of the second current error amplifier U6, an output of the second current error amplifier U6 is connected to a second input of the gate circuit U7, and an output of the gate circuit U7 is connected to an input of the logic operation and wave-sending circuit U8, an output of the logical operation and wave-sending circuit U8 is connected to an input of the drive circuit U9, and an output of the drive circuit U9 is connected to power switches of the switch bridge arms 1.

The gate circuit U7, on the one hand, accepts control instructions to determine the power flow direction of the AC and DC side, and on the other hand, detects a voltage amplitude of the AC and DC side to determine an operation mode. The input of the drive circuit U9 is connected to the output of the logic operation and wave-sending circuit U8. Thus, a PWM driving signal is generated, and the PWM driving signal is then passed through the drive circuit U9 to generate multiple driving voltages and output the same to the power switches of the switch bridge arms 1.

The controller 40 may adopt an average current mode or a peak current mode for controlling through the proportional-integral (PI) compensation design of the corresponding current inner loop, so as to improve a dynamic response performance. It should be noted that the voltage error amplifier and the current error amplifier in the controller 40 may adopt a second-order or a multi-order PI compensation or other intelligent control methods. Optionally, the controller 40 may also adopt other types of control methods, such as a quasi-resonant control, a single-cycle control, a continuous current mode (CCM), a discontinuous current mode (DCM), a critical current mode (CRM), etc., and the electrical performance and effect will not be affected.

To further reduce the switch power consumption, the switch bridge arm 1 in each first type of bidirectional switch network 11 may enabled to implement a soft switching by using non-interleaved parallel connection technology. Optionally, in the first type of bidirectional switch network 11, the driving signals received by the upper and lower bridge arms of the switch bridge arm 1 have opposite levels and provided with a dead time of a preset size. A conduction condition of the switch bridge arm 1 is that:

$D>0.5$ and $\Phi<(1-D)$, or alternatively, $D<0.5$ and $\Phi<D$;

Where, D represents an operation duty cycle of the upper or lower bridge arm of each switch bridge arm 1, $\Phi$ represents an operation phase difference in each switch bridge arm 1, and the operation phase difference is greater than the dead time in each switch bridge arm 1.

The controller 40 may adopt the above modulation mode to ensure that a zero-voltage soft switching is realized by the power switch, so as to reduce or even eliminate the switch power consumption, and achieve a higher conversion efficiency. Correspondingly, the bidirectional inverter circuit is enabled to operate at a higher switch frequency, Thus, the size of passive components such as inductors and capacitors is reduced, and meanwhile, the cost is reduced.

Also, through the above modulation mode, a multi-level output from the midpoint of the inverting coupling transformer T can be realized, an inductance of the filter inductor L and an output harmonic can be reduced, a power quality can be improved, and the switch power consumption of the power switch can be further reduced.

Figure 7:
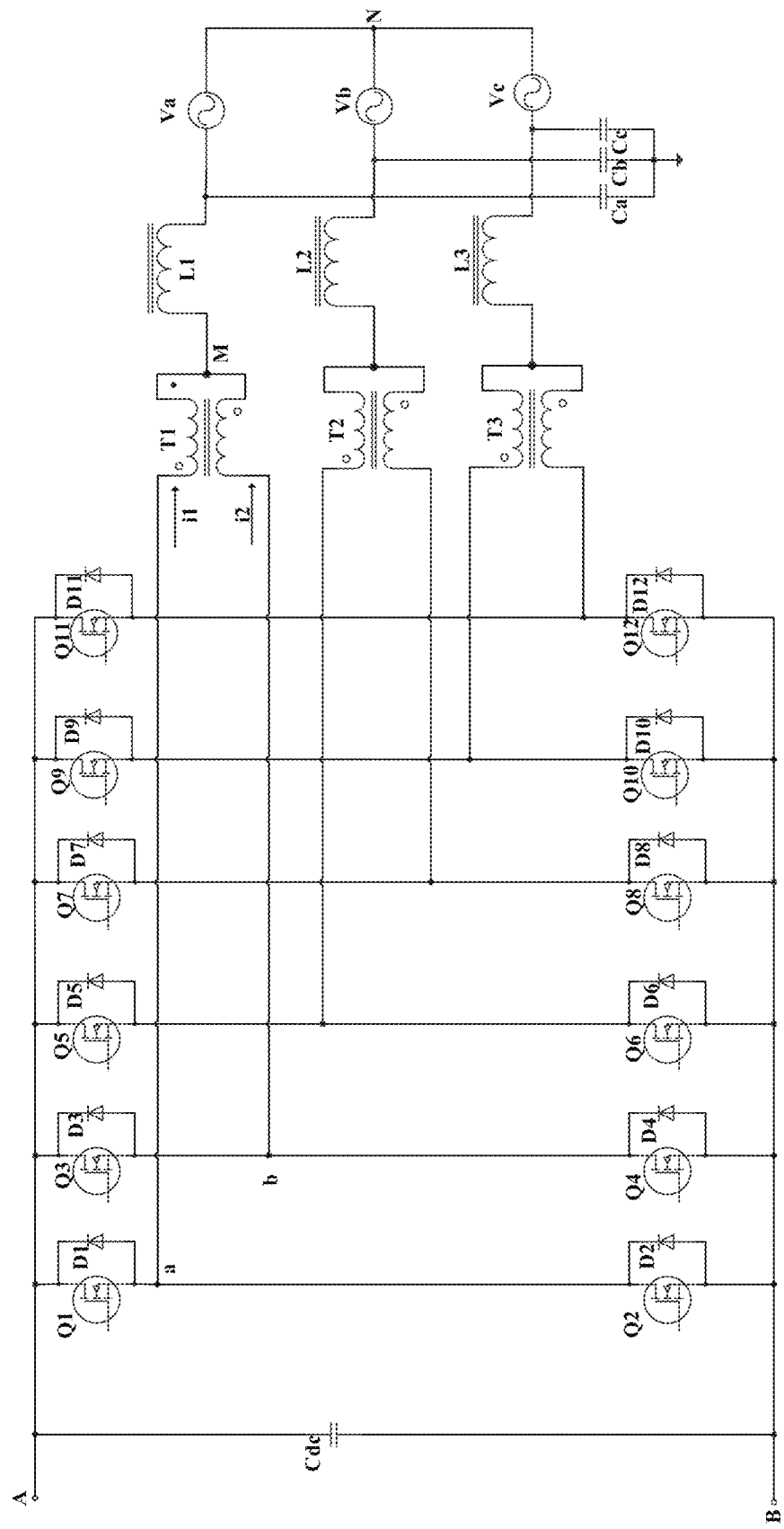
FIG. 7 is a third structural schematic diagram of the bidirectional inverter circuit provided by an embodiment of the present application.

The bidirectional switch network may be extended to two phases or multiple phases, for example, as shown in FIG. 6, two first type of bidirectional switch networks 11 are included, or optionally, as shown in FIG. 7, three first type of bidirectional switch networks 11 are included. The two or three first type of bidirectional switch networks are respectively connected with an AC bus C, and output two-phase AC power Vac or three-phase AC power Va, Vb, Vc during an inverter conversion.

Figure 8:
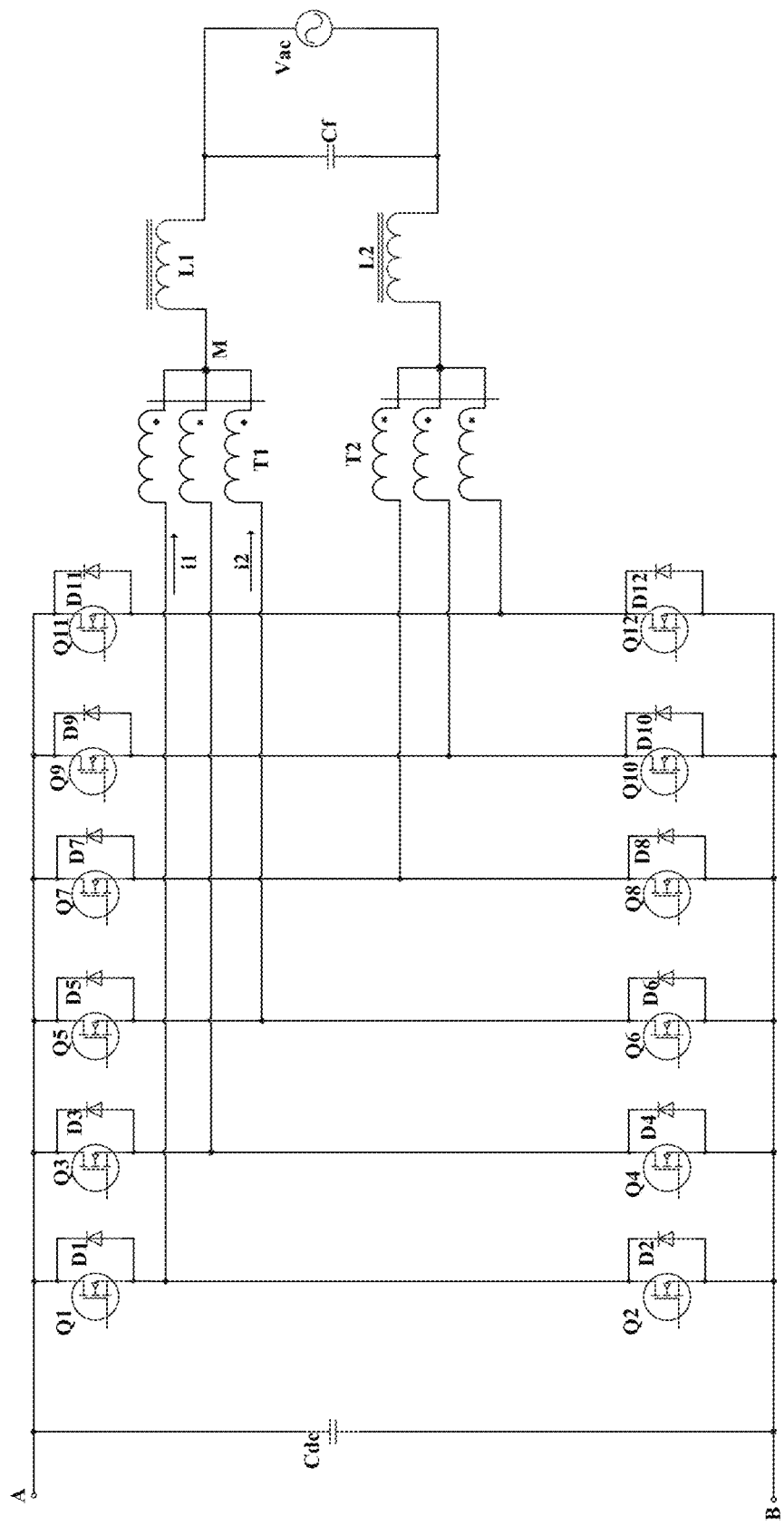
FIG. 8 is a fourth structural schematic diagram of the bidirectional inverter circuit provided by an embodiment of the present application.

Meanwhile, the number of windings and the number of bridge arms of the inverting coupling transformer T may be set at least two, respectively. For example, as shown in FIG. 7, each inverting coupling transformer T includes two windings, each winding is connected with a midpoint of one switch bridge arm 1, or as shown in FIG. 8, each inverting coupling transformer T includes three windings, and each winding is connected with a midpoint of one switch bridge arm 1.

The working principle of the bidirectional inverter circuit will be described below in conjunction with a specific circuit.

As shown in FIG. 6, each bidirectional switch network 10 includes a first switch bridge arm and a second switch bridge arm, and each switch bridge arm 1 includes two power switches connected in series and two body diodes respectively connected in anti-parallel with the two power switches Q1, forming the upper bridge arm and the lower bridge arm respectively. The two power switches are connected in series and connected between the positive DC bus A and the negative DC bus B. A connection node of the two power switches is connected to the winding of the inverting coupling transformer T.

For example, the first switch bridge arm is constituted by first and second power switches Q1, Q2 and first body diodes D1, D2 connected to the first and second power switches Q1, Q2. The second switch bridge arm is constituted by third and fourth power switches Q3, Q4 and first body diodes D3, D4 connected to the third and fourth power switches Q3, Q4. A first bidirectional switch network 10 is constituted by the first switch bridge arm, the second switch bridge arm, a first inverting coupling transformer T1 and a first filter inductor L1, where the first switch bridge arm and the second switch bridge arm form a two-phase non-interleaved parallel connection.

A third switch bridge arm 1 is constituted by fifth and sixth power switches Q5, Q6 and first body diodes D5, D6 connected to the fifth and sixth power switches Q5, Q6. A fourth switch bridge arm 1 is constituted by seventh and eighth power switches Q7, Q8 and first body diodes D7, D8 connected to the seventh and eighth power switches Q7, Q8. A second bidirectional switch network 10 is constituted by the third switch bridge arm 1, the fourth switch bridge arm 1, a second inverting coupling transformer T2 and a second filter inductor L2, where the third switch bridge arm 1 and the fourth switch bridge arm 1 form a two-phase non-interleaved parallel connection.

A fifth switch bridge arm 1 is constituted by ninth and tenth power switches Q9, Q10 and first body diodes D9, D10 connected to the ninth and tenth power switches Q9, Q10. A sixth switch bridge arm 1 is constituted by eleventh and twelfth power switches Q11, Q12 and first body diodes D11, D12 connected to the eleventh and twelfth power switches Q11, Q12. A third bidirectional switch network 10 is constituted by the fifth switch bridge arm 1, the sixth switch bridge arm 1, a third inverting coupling transformer T and a third filter inductor L, where the fifth switch bridge arm 1 and the sixth switch bridge arm 1 form a two-phase non-interleaved parallel connection.

In an inverter operation mode, the first power switch Q1 and the third power switch Q3 are operated at a high-frequency sine wave pulse width modulation (SPWM) mode. The driving voltages of the second power switch Q2 and the fourth power switch Q4 are respectively reverse to those of the first power switch Q1 and the third power switch Q3, and a certain dead time is respectively set between the driving voltages of the first power switch Q1 and the second power switch Q2, and between the driving voltages of the third power switch Q3 and the fourth power switch Q4.

Also, the fifth power switch Q5 and the seventh power switch Q7 are operated at the high-frequency sine wave pulse width modulation (SPWM) mode. The driving voltages of the sixth power switch Q6 and the eighth power switch Q8 are respectively reverse to those of the fifth power switch Q5 and the seventh power switch Q7, and a certain dead time is respectively set between the driving voltages of the fifth power switch Q5 and the sixth power switch Q6, and between the driving voltages of the seventh power switch Q7 and the eighth power switch Q8.

The ninth power switch Q9 and the eleventh power switch Q11 are operated at the high-frequency sine wave pulse width modulation (SPWM) mode. The driving voltages of the tenth power switch Q10 and the twelfth power switch Q12 are respectively reverse to those of the ninth power switch Q9 and the eleventh power switch Q11, and a certain dead time is respectively set between the driving voltages of the ninth power switch Q9 and the tenth power switch Q10, and between the driving voltages of the eleventh power switch Q11 and the twelfth power switch Q12.

Figure 9:
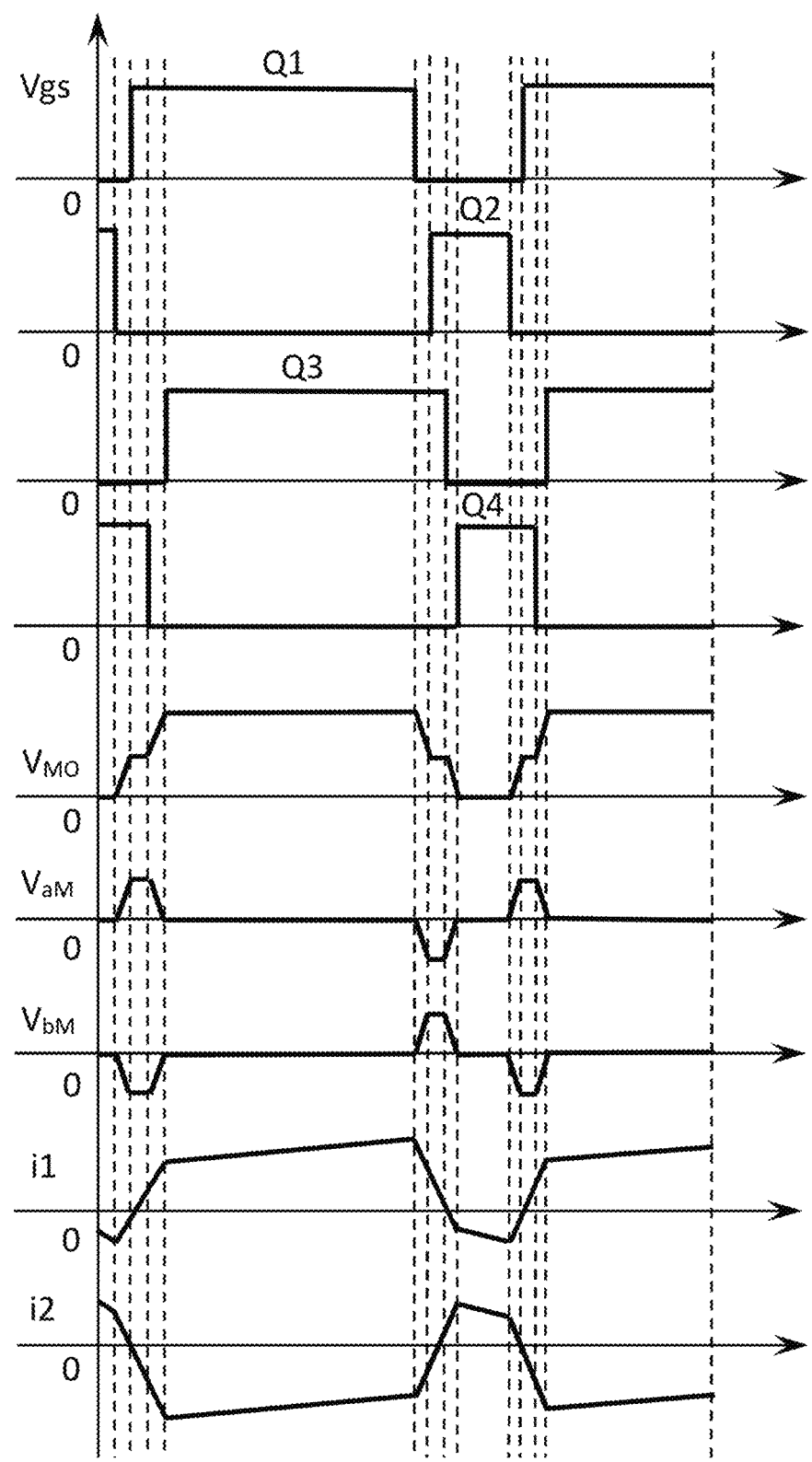
FIG. 9 is a schematic waveform diagram of the bidirectional inverter circuit provided by an embodiment of the present application.

The following takes the first bidirectional switch network 10 in the inverter operation mode as an example to illustrate the working principle of the soft switching of the bidirectional inverter circuit:

It is assumed that the operation duty cycle D of the first power switch Q1 and the third power switch Q3 is greater than 0.5, i.e., D>0.5. FIG. 9 shows several main operation waveform diagrams, where a represents a bridge-arm midpoint of the first switch bridge arm in the bidirectional switch network 10, b represents a bridge-arm midpoint of the second switch bridge arm, M represents a midpoint of the first inverting coupling transformer T1, O represents the ground or a negative end of the DC power supply, $V_{MO}$ represents a voltage between point M to point O, $V_{aM}$ represents a voltage between the bridge-arm midpoint a of the switch bridge arm 1 of the first bidirectional switch network 10 shown in FIG. 6 and the midpoint M of the first inverting coupling transformer T1, and $V_{bM}$ represents a voltage between the bridge-arm midpoint b of the switch bridge arm 1 of the first bidirectional switch network 10 shown in FIG. 6 and the midpoint M of the first inverting coupling transformer T1.

As shown in FIG. 9, from top to bottom are operation waveforms of the driving voltages Vgs, VMO, VaM, VbM of the first power switch Q1 to the fourth power switch Q4, and the currents i1, i2 flowing through the primary side and secondary side of the first inverting coupling transformer T1. A positive direction of current is shown in FIG. 6.

When the first power switch Q1 and the fourth power switch Q4 are both switched on, $V_{MO}=\frac{1}{2}*V_{dc}$, $V_{aM}=\frac{1}{2}*V_{dc}$, $V_{bM}=-\frac{1}{2}*V_{dc}$, i1 increases linearly, and i2 decreases linearly.

When the first power switch Q1 and the third power switch Q3 are both switched on, $V_{MO}=V_{dc}$, $V_{aM}=0$, $V_{bM}=0$, due to the influence of leakage inductance, i1 continues to increase slightly, and i2 increases slightly in a reverse direction.

When the third power switch Q3 and the second power switch Q2 are both switched on, $V_{MO}=\frac{1}{2}*V_{dc}$, $V_{aM}=-\frac{1}{2}*V_{dc}$, $V_{bM}=\frac{1}{2}*V_{dc}$, i1 decreases linearly, i2 increases linearly.

When the second power switch Q2 and the fourth power switch Q4 are both switched on, $V_{MO}=0$, $V_{aM}=0$, $V_{bM}=0$, due to the influence of leakage inductance, i1 decreases slightly in the reverse direction, and i2 continues to decrease slightly.

Both i1 and i2 are negative before the first power switch Q1 and the third power switch Q3 are switched on, so the first power switch Q1 and the third power switch Q3 are both enabled to realize a zero voltage (ZVS) switch-on. Both i1 and i2 are positive before the second power switch Q2 and the fourth power switch Q4 are switched on, so the second power switch Q2 and the fourth power switch Q4 are also enabled to realize the zero voltage (ZVS) switch-on. Meanwhile, after the first power switch Q1 to the fourth power switch Q4 are switched off, the absolute values of i1 and i2 decrease linearly, which can reduce or even eliminate the power consumption for reverse recovery of the body diodes. In addition, by utilizing the parasitic capacitance between the drains and sources of the first power switch Q1 to the fourth power switch Q4, or the respective external capacitors, the first power switch Q1 to the fourth power switch Q4 are enabled to realize an approximately zero voltage switch-off.

The working principles of the second bidirectional switch network 10 and the third bidirectional switch network 10 are exactly the same, and will not be repeated here. The working principles when the operation duty cycle of the first power switch Q1 and the third power switch Q3 is smaller than 0.5, i.e., D<0.5 is basically similar to the above-mentioned working principles when D>0.5, and the details will not be repeated here.

Conversely, in a rectification mode, the second power switch Q2 and the fourth power switch Q4 are operated at the high-frequency pulse width modulation (PWM) mode, and the first power switch Q1 and the third power switch Q3 are operated for a synchronous rectification. The driving voltages of the first power switch Q1 and the third power switch Q3 are respectively reverse to those of the second power switch Q2 and the fourth power switch Q4, and a certain dead time is respectively set between the driving voltages of the first power switch Q1 and the second power switch Q2, and between the driving voltages of the third power switch Q3 and the fourth power switch Q4, meanwhile, the fifth power switch Q5 and the sixth power switch Q6 are still power frequency switches. The working principle in the rectification mode is similar to that in the inverter operation mode, and will not be repeated here.

In this solution, the zero-voltage soft switching of the power switch is realized by generating a circulating current in an appropriate amplitude, and the power consumption for reverse recovery of the body diodes is reduced without being limited to a specific control method. Since the amplitude of the circulating current is small, excessive circulating current power consumption will not be caused.

In summary, when the bidirectional inverter circuit adopts a modulation mode of phase-shifting interlaced phase $\Phi \neq 360°/N$, the high-frequency power switches Q1~Q8 or Q1~Q12 can realize zero-voltage soft switching and reduce the power consumption for reverse recovery of the body diodes, thereby the switch power consumption can be reduced or even eliminated, and thus the higher conversion efficiency can be achieved.

Due to the lower switch power consumption, the bidirectional inverter circuit is enabled to operate at a higher switch frequency, thereby the size of passive components such as inductors and capacitors is reduced, and thus the cost is reduced. As can be seen from the $V_{MO}$ waveform that the midpoint of the first inverting coupling transformer T1 is a three-level output, and combined with the second bidirectional switch network 10, a total transformer midpoint of the two is a five-level output. Multi-level operation can reduce the inductance of the filter inductor L, reduce the output harmonics, improve the power quality, further reduce the switch power consumption of the power switch, reduce the size of the inductor and reduce the cost. The two windings of the transformer and the power switch are connected in parallel to share the current respectively, and the heat distribution is relatively balanced. When the operation duty cycle is 0.5, the two-phase current and heat can be shared equally, thereby improving the operation reliability of the bidirectional inverter circuit and the bidirectional inverter.

The bidirectional switch network 10 and the switch bridge arm 1 may be extended to multi-phase non-interleaved parallel and series circuit structures, so as to achieve higher power levels.

In the M bidirectional switch networks 10, a corresponding number of the first type of bidirectional switch network 11, the second type of bidirectional switch network 12 and the third bidirectional switch network 10 may be set, and meanwhile, corresponding power switches are selectable for the switch bridge arms 1 of the second bidirectional switch network 10 and the third bidirectional switch network 10.

Optionally, when m1≥3, as shown in FIG. 7, m1 filter inductors L are respectively connected with an AC bus C, each filter inductor L is also connected to the midpoint of an inverting coupling transformer T, during the inverter conversion, three-phase AC power Va, Vb, Vc are output.

Or alternatively, the m1 filter inductors L are divided into multiple groups, and each group is connected with an AC bus C, each group includes at least one filter inductor L and is connected to the same AC bus C, and each filter inductor L is also connected to the midpoint of an inverting coupling transformer T.

Figure 10:
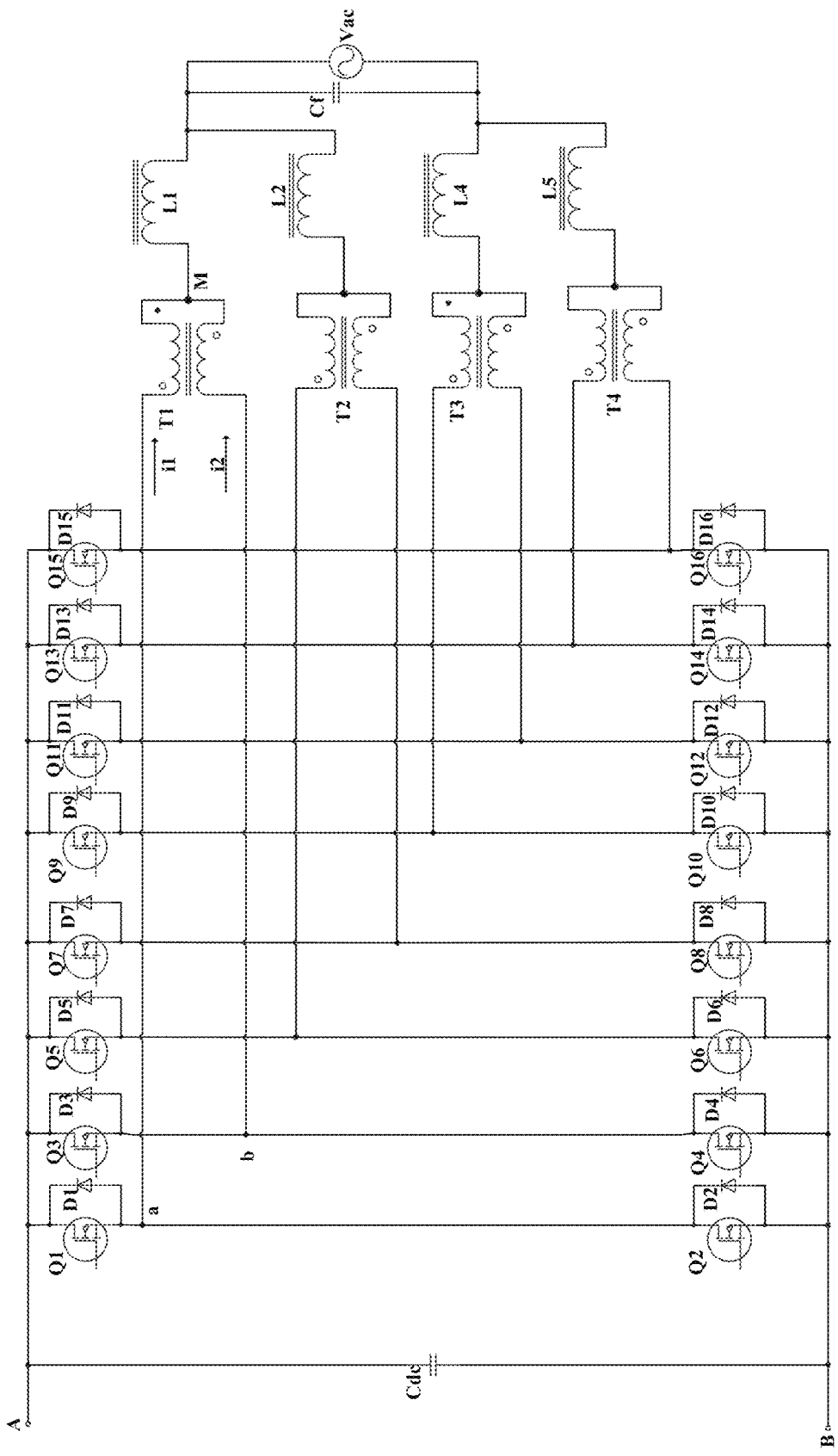
FIG. 10 is a fifth structural schematic diagram of the bidirectional inverter circuit provided by an embodiment of the present application.

As shown in FIG. 10, it is assumed that four bidirectional switch networks of the first type are included. In the first bidirectional switch network, the first switch bridge arm includes a first power switch Q1 and a second power switch Q2, and the first power switch Q1 is connected in series with the second power switch Q2. The second switch bridge arm includes a third power switch Q3 and a fourth power switch Q4, and the third power switch Q3 is connected in series with the fourth power switch Q4. The bridge-arm midpoint of the first switch bridge arm is connected to a first winding of the inverting coupling transformer T1, the bridge-arm midpoint of the second switch bridge arm is connected to a second winding of the inverting coupling transformer T1, and the inverting coupling transformer T1 is connected to a first end of the filter inductor L1. The first switch bridge arm and the second switch bridge arm form a two-phase non-interleaved parallel connection.

In the second bidirectional switch network, the first switch bridge arm includes a fifth power switch Q5 and a sixth power switch Q6, and the fifth power switch Q5 is connected in series with the sixth power switch Q6. The second switch bridge arm includes a seventh power switch Q7 and an eighth power switch Q8, and the seventh power switch Q7 is connected in series with the eighth power switch Q8. The bridge-arm midpoint of the first switch bridge arm is connected to a first winding of the inverting coupling transformer T2, the bridge-arm midpoint of the second switch bridge arm is connected to a second winding of the inverting coupling transformer T2, and the inverting coupling transformer T2 is connected to a first end of the filter inductor L2. The first switch bridge arm and the second switch bridge arm form a two-phase non-interleaved parallel connection.

In the third bidirectional switch network, the first switch bridge arm includes a ninth power switch Q9 and a tenth power switch Q10, and the ninth power switch Q9 is connected in series with the tenth power switch Q10. The second switch bridge arm includes an eleventh power switch Q11 and a twelfth power switch Q12, and the eleventh power switch Q11 is connected in series with the twelfth power switch Q12. The bridge-arm midpoint of the first switch bridge arm is connected to a first winding of the inverting coupling transformer T3, the bridge-arm midpoint of the second switch bridge arm is connected to a second winding of the inverting coupling transformer T3, and the inverting coupling transformer T3 is connected to a first end of the filter inductor L3. The first switch bridge arm and the second switch bridge arm form a two-phase non-interleaved parallel connection.

In the fourth bidirectional switch network, the first switch bridge arm includes a thirteenth power switch Q13 and a fourteenth power switch Q14, and the thirteenth power switch Q13 is connected in series with the fourteenth power switch Q14. The second switch bridge arm includes a fifteenth power switch Q15 and a sixteenth power switch Q16, and the fifteenth power switch Q15 is connected in series with the sixteenth power switch Q16. The bridge-arm midpoint of the first switch bridge arm is connected to a first winding of the inverting coupling transformer T4, the bridge-arm midpoint of the second switch bridge arm is connected to a second winding of the inverting coupling transformer T4, and the inverting coupling transformer T4 is connected to a first end of the filter inductor L4. The first switch bridge arm and the second switch bridge arm form a two-phase non-interleaved parallel connection.

A second end of the filter inductor L2 is connected to a second end of the filter inductor L1, and a second end of the filter inductor L4 is connected to a second end of the filter inductor L3. The second end of the filter inductor L1 and the second end of the filter inductor L3 are respectively connected with two ends of the second filter capacitor Cf. The AC power supply Vac is connected in parallel with the two ends of the second filter capacitor Cf.

The newly-added second bidirectional switch network and fourth bidirectional switch network are connected in a similar manner to the first bidirectional switch network and second bidirectional switch network shown in FIG. 6, and will not be repeated here. In addition, the working principle of the four-way bidirectional switch network is similar to that of the first embodiment, and will not be repeated here, either. The circuit structure of the four bidirectional switch networks can reach higher power levels.

Figure 11:
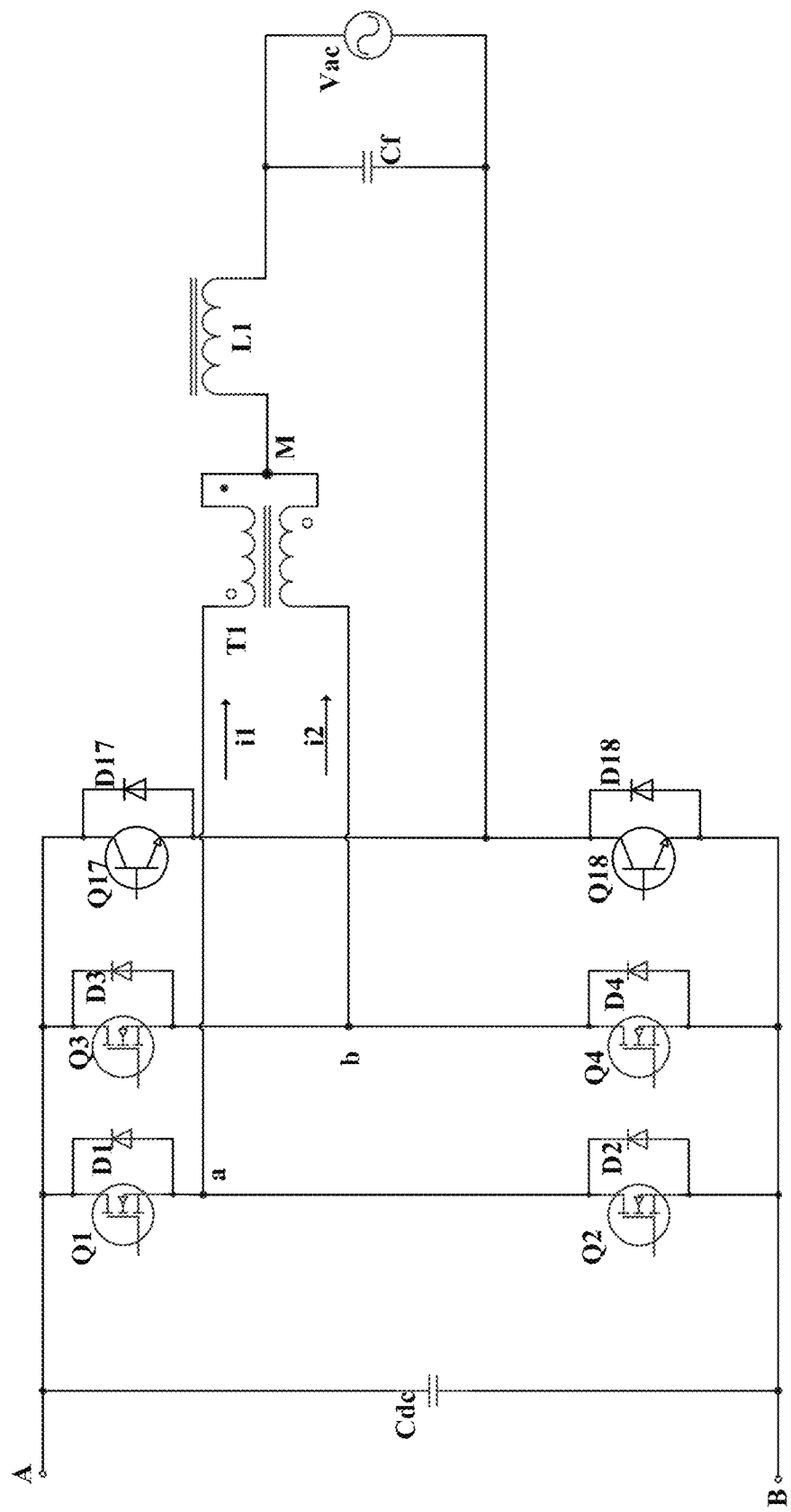
FIG. 11 is a sixth structural schematic diagram of the bidirectional inverter circuit provided by an embodiment of the present application.

As shown in FIG. 11, optionally, in the second bidirectional switch network 10, the second type of bidirectional switch network 12 or the third type of bidirectional switch network 13 is selected, and the switch bridge arm 1 includes two insulated gate bipolar transistors Q17 and Q18 connected in series and two body diodes D17 and D18 connected in anti-parallel with the two insulated gate bipolar transistors Q17 and Q18 respectively;

The two insulated gate bipolar transistors Q17 and Q18 are connected in series and connected between the positive DC bus A and the negative DC bus B, and the connection node of the two insulated gate bipolar transistors Q17 and Q18 is connected to an AC bus C.

Or alternatively, two insulated gate bipolar transistors Q17 and Q18 are connected in series and connected between the positive DC bus A and the negative DC bus B, the connection node of the two insulated gate bipolar transistors Q17 and Q18 is connected to the first end of the filter inductor L is connected, and the second end of the filter inductor L is connected to an AC bus C.

In the present application, the power switch is replaced by two insulated gate bipolar transistors (IGBT) Q17, Q18 and their body diodes D17 and D18. After IGBTs Q17 and Q18 are used, the switch bridge arm 1 adopts a unipolar control mode, while Q1~Q4 still adopts a bipolar control mode. Since the cost of the IGBT is lower than that of the MOSFET, the cost of the bidirectional inverter circuit and the bidirectional inverter is further reduced. The working principle and modulation mode of the soft switching are basically similar to those shown in FIGS. 6 to 9, and will not be repeated here. Optionally, a filter inductor L may be added at a connection midpoint of the IGBT bridge arms Q17 and Q18, and the circuit structure used in here is that shown in FIG. 3. Optionally, 5 inverting coupling transformers T or coupled inductors are used.

Figure 12:
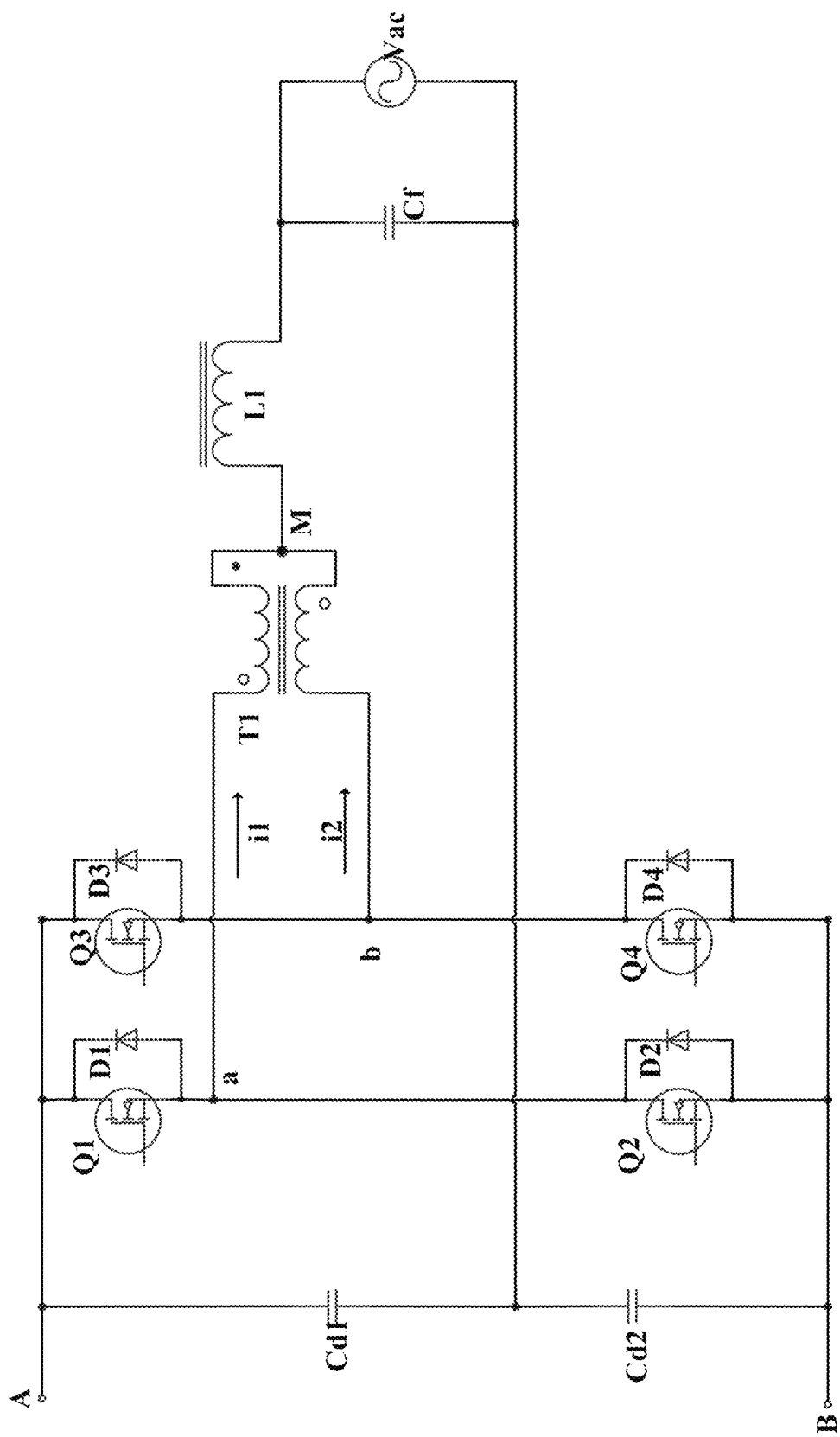
FIG. 12 is a seventh structural schematic diagram of the bidirectional inverter circuit provided by an embodiment of the present application.

Optionally, as shown in FIG. 12, in the second type of bidirectional switch network 12 or the third type of bidirectional switch network 13, the switch bridge arm 1 includes two filter capacitors Cd1 and Cd2 connected in series.

The two filter capacitors Cd1 and Cd2 are connected in series and connected between the positive DC bus A and the negative DC bus B, and a connection node of the two filter capacitors Cd1 and Cd2 is connected to an AC bus C.

Or alternatively, the two filter capacitors Cd1 and Cd2 are connected in series and connected between the positive DC bus A and the negative DC bus B, the connection node of the two filter capacitors Cd1 and Cd2 is connected to the first end of the filter inductor L, and the second end of the filter inductor L is connected to an AC bus C.

In this embodiment, the switch bridge arm 1 constituted by power switches Q5~Q8 in the second bidirectional switch network 10 in FIG. 6 is replaced by two filter capacitors Cd1, Cd2. As shown in FIG. 10, Q1~Q4 still adopts the bipolar control mode. Since the cost of the capacitor is much lower than that of the MOSFET, the cost of the bidirectional inverter circuit and the bidirectional inverter is further reduced. The working principle and modulation mode of the soft switching are basically similar to those shown in FIGS. 6 to 9, and will not be repeated here. Optionally, a filter inductor L may be added to the connection node of the filter capacitors Cd1 and Cd2. Optionally, the circuit structure used in here is that shown in FIG. 3. Optionally, 5 inverting coupling transformers T or coupled inductors are used.

Figure 13:
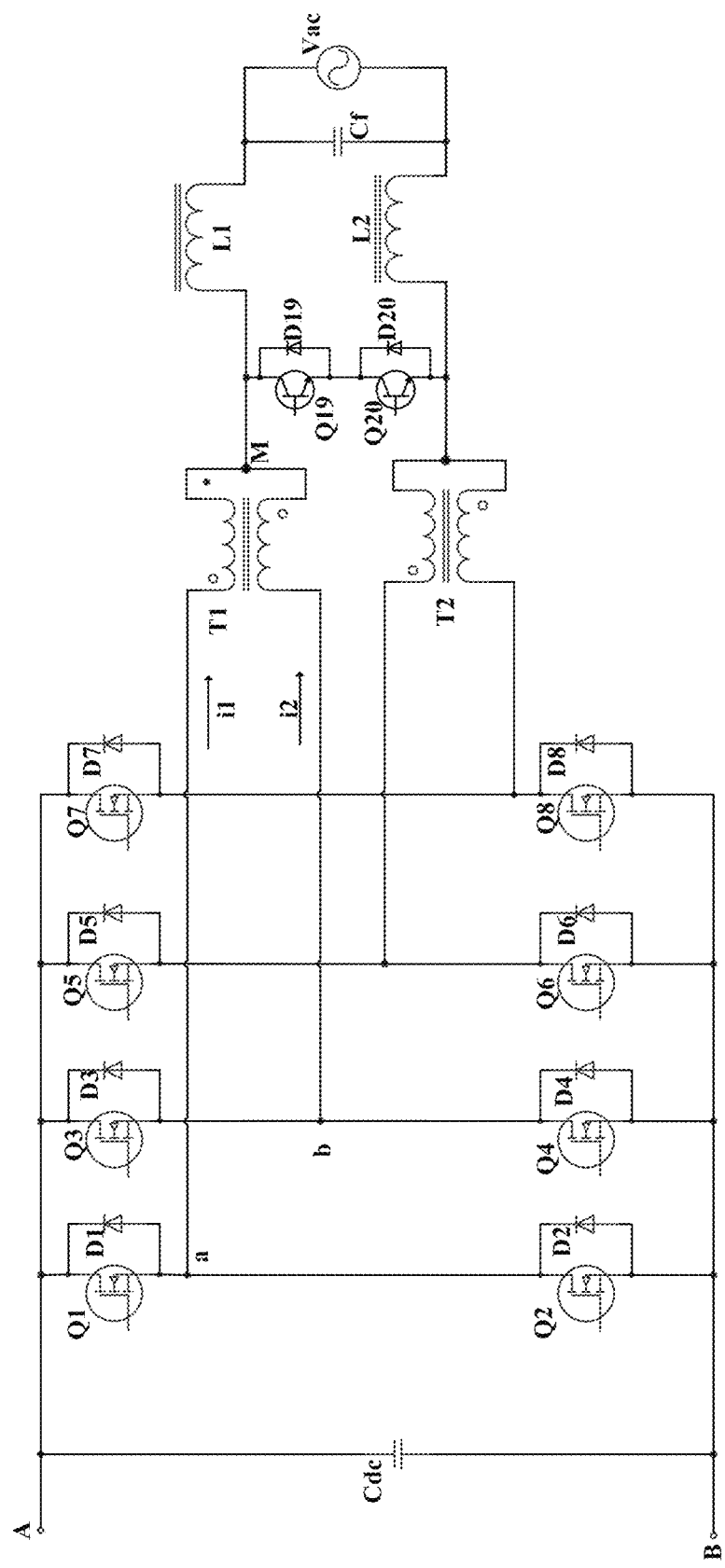
FIG. 13 is an eighth structural schematic diagram of the bidirectional inverter circuit provided by an embodiment of the present application.

Optionally, as shown in FIG. 13, when m1≥2;

A persistent current switch for following current is connected in parallel between the first ends of the filter inductors L of every two adjacent first type of bidirectional switch networks 11.

The persistent current switch includes a first persistent current switch Q19 and a second persistent current switch Q20 connected in series and two third body diodes D19, D20 connected in anti-parallel with the first persistent current switch Q19 and the second persistent current switch Q20 respectively.

In this embodiment, after adding the persistent current switch, part of the working principle is similar to the bidirectional HERIC inverter circuit, which can reduce a common mode interference and leakage current of the bidirectional inverter circuit, and also form a multi-level operation. The multi-level operation can reduce the inductance of the filter inductor L, thereby further reducing the size and cost of the bidirectional inverter circuit and the bidirectional inverter. The working principle and modulation mode of the soft switching are basically similar to those shown in FIGS. 6 to 7, and will not be repeated here. It should be noted that, similar to the bidirectional HERIC inverter circuit, not only the bidirectional switch constituted by Q19 and Q20 connected in series back-to-back as shown in the figure may be used, but also other types of bidirectional switches may be used.

It should be noted that the above embodiments are all focused on a single two-phase non-interleaved parallel soft switching bidirectional inverter circuit. In fact, the bidirectional switch network and switch bridge arms of these bidirectional inverter circuits may also be extended to multi-phase non-interleaved parallel soft switching bidirectional inverter circuit or series circuit structure, so as to achieve higher power levels.

Compared with the conventional arts, the embodiments of the present application have beneficial effect that: when the above-mentioned bidirectional inverter circuit adopts the inverting coupling transformer T to perform the bidirectional power conversion, a current loop can be formed by the switch bridge arm 1, which enables the body diode of a corresponding power switch to be switched on before the corresponding power switch of the switch bridge arm 1 being switched on, thereby the power consumption for reverse recovery of the body diode of the corresponding power switch is reduced, realizing a zero-voltage soft switching, and thus the switch power consumption of the power switch is reduced. Meanwhile, a multi-level output can be realized at the midpoint of the inverting coupling transformer T, thereby the switch power consumption of the power switch is further reduced.

The present application also provides a bidirectional inverter, which includes a bidirectional inverter circuit. For the specific structure of the bidirectional inverter circuit, references may be made to the above-mentioned embodiments. Since the bidirectional inverter adopts all the technologies of the above-mentioned embodiments, the bidirectional inverter has at least all the beneficial effects brought by the technical solutions of the above embodiments, which will not be repeated here.

The above-described embodiments are only used to illustrate the technical solutions of the present application, rather than being intended to limit the present application. Although the present application has been described in detail with reference to the foregoing embodiments, those of ordinary skill in the art should understand that the technical solutions described in the foregoing embodiments may still be modified or some of the technical features in the technical solutions may be equivalently substituted. These modifications or substitutions do not make the essence of the corresponding technical solutions deviate from the spirit and scope of the technical solutions of various embodiments of the present application, and should all be included within the protection scope of the present application.

What is claimed is:

1. A bidirectional inverter circuit, comprising: a positive direct current (DC) bus, a negative DC bus, M bidirectional switch networks and M alternating current (AC) buses, wherein M≥2;
   wherein,
   the M bidirectional switch networks comprises m1 first type of bidirectional switch networks, m2 second type of bidirectional switch networks, and m3 third type of bidirectional switch networks, each of the m1 first type of bidirectional switch networks comprises an inverting coupling transformer, a filter inductor and a plurality of switch bridge arms, each of the m2 second type of bidirectional switch networks comprises a filter inductor and a switch bridge arm, each of the m3 third type of bidirectional switch networks comprises a switch bridge arm, wherein m1+m2+m3=M, and m1≥1;
   in each of the m1 first type of bidirectional switch networks, positive DC ends of the plurality of switch bridge arms are respectively connected to the positive DC bus, negative DC ends of the plurality of switch bridge arms are respectively connected to the negative DC bus, and each bridge-arm midpoint of the plurality of switch bridge arms is respectively connected to one winding of the inverting coupling transformer, a midpoint of the inverting coupling transformer is connected to a first end of the filter inductor, and a second end of the filter inductor is connected to one of the M AC buses;
   if m2≥1, in each of the m2 second type of bidirectional switch networks, a positive DC end, a negative DC end and a bridge-arm midpoint of the switch bridge arm are respectively connected to the positive DC bus, the negative DC bus and a first end of the filter inductor in a one-to-one correspondence, and a second end of the filter inductor is connected to one of the M AC buses; and
   if m3≥1, in each of the m3 third type of bidirectional switch networks, a positive DC end, a negative DC end and a bridge-arm midpoint of the switch bridge arm are respectively connected to the positive DC bus, the negative DC bus and one of the M AC buses in a one-to-one correspondence.

2. The bidirectional inverter circuit according to claim 1, further comprising:
   a controller, respectively connected to the positive DC bus, the negative DC bus, the M AC buses and the M bidirectional switch networks,
   wherein the controller is configured to output corresponding driving voltages to the switch bridge arms according to a driving instruction and electrical sampling signals of the positive DC bus, the negative DC bus and the M AC buses, to drive the M bidirectional switch networks to perform a rectification conversion or an AC conversion, and correspondingly output an AC signal or a DC signal of a preset magnitude.

3. The bidirectional inverter circuit according to claim 2, wherein the controller comprises:
   a first voltage sampling circuit, connected to the positive DC bus and configured to perform a voltage sampling on the positive DC bus to generate a first voltage sampling signal;
   a second voltage sampling circuit, connected to the M AC buses and configured to perform a voltage sampling on the M AC buses to generate a second voltage sampling signal;
   a current sampling circuit, connected to the M AC buses and configured to perform a current sampling on the M AC buses to generate a current sampling signal;
   a first comparison circuit, respectively connected to the first voltage sampling circuit and the current sampling circuit, and configured to perform a comparison on the first voltage sampling signal and a first reference voltage signal, and to generate a first feedback signal according to a comparison result and the current sampling signal;
   a second comparison circuit, respectively connected to the second voltage sampling circuit and the current sampling circuit, and configured to perform a comparison on the second voltage sampling signal and a second reference voltage signal, and to generate a second feedback signal according to a comparison result and the current sampling signal;
   a gate circuit, respectively connected to the first comparison circuit and the second comparison circuit, and configured to generate a control signal according to the driving instruction, the first feedback signal and the second feedback signal;
   a logic operation and wave-sending circuit, connected to the gate circuit, and configured to generate a pulse width modulation (PWM) driving signal according to the control signal; and
   a drive circuit, respectively connected to the logic operation and wave-sending circuit and the switch bridge arms of the M bidirectional switch networks, and configured to generate a driving voltage of a corresponding voltage magnitude to each of the switch bridge arms according to the PWM driving signal, so as to drive the M bidirectional switch networks to perform the rectification conversion or the AC conversion, and correspondingly output the AC signal or the DC signal of the preset magnitude.

4. The bidirectional inverter circuit according to claim 1, wherein when m1≥3, each of m1 filter inductors is respectively connected to one of the M AC buses, and each of the m1 filter inductors is further connected to a midpoint of one inverting coupling transformer; or
   alternatively, the m1 filter inductors are divided into multiple groups and each of the multiple groups is respectively connected to one of the M AC buses and comprises at least one filter inductor, and the at least one filter inductor is connected to a same AC bus, each of the m1 filter inductors is further connected to the midpoint of one inverting coupling transformer.

5. The bidirectional inverter circuit according to claim 1, wherein, in each of the m2 second type of bidirectional switch network or each of the m3 third type of bidirectional switch network, the switch bridge arm comprises two insulated gate bipolar transistors connected in series and two body diodes connected in anti-parallel to the two insulated gate bipolar transistors, respectively;

In each of the m3 third type of bidirectional switch network, the two insulated gate bipolar transistors are connected in series and connected between the positive DC bus and the negative DC bus, and a connection node of the two insulated gate bipolar transistors is connected to one of the M AC buses; or alternatively, in each of the m2 second type of bidirectional switch network, the two insulated gate bipolar transistors are connected in series and connected between the positive DC bus and the negative DC bus, and the connection node of the two insulated gate bipolar transistors is connected to the first end of the filter inductor, and the second end of the filter inductor is connected to one of the M AC buses.

6. The bidirectional inverter circuit according to claim 1, wherein, in each of the m2 second type of bidirectional switch network or each of the m3 third type of bidirectional switch network, the switch bridge arm comprises two filter capacitors connected in series;

in each of the m3 third type of bidirectional switch network, the two filter capacitors are connected in series and connected between the positive DC bus and the negative DC bus, and a connection node of the two filter capacitors is connected to one of the M AC buses; or alternatively, in each of the m2 second type of bidirectional switch network, the two filter capacitors are connected in series and connected between the positive DC bus and the negative DC bus, the connection node of the two filter capacitors is connected to the first end of the filter inductor, and the second end of the filter inductor is connected to one of the M AC buses.

7. The bidirectional inverter circuit according to claim 1, wherein the filter inductor is an equivalent leakage inductance of the inverting coupling transformer.

8. The bidirectional inverter circuit according to claim 1, wherein when m1≥2;

a persistent current switch for following current is connected in parallel between the first ends of the filter inductors of every two adjacent first type of bidirectional switch networks;

the persistent current switch comprises a first persistent current switch and a second persistent current switch connected in series, and two third body diodes connected in anti-parallel to the first persistent current switch and the second persistent current switch respectively.

9. The bidirectional inverter circuit according to claim 1, wherein, the bidirectional inverter circuit adopts a modulation mode of phase-shifting interlaced phase Φ≠360°/N, and in each of the m1 first type of bidirectional switch network, driving signals received by upper and lower bridge arms of each switch bridge arm are at opposite levels and the switch bridge arm has a dead time of a preset size, and a conduction condition of the switch bridge arm is that:

D>0.5 and Φ<(1−D), or alternatively, D<0.5 and Φ<D;

wherein, N represents a number of switch bridge arms in each of the m1 first type of bidirectional switching network, D represents an operation duty cycle of the upper bridge arm or the lower bridge arm of each switch bridge arm, Φ represents an operation phase difference in each switch bridge arm, and the operation phase difference is greater than the dead time of each switch bridge arm.

10. A bidirectional inverter, comprising:
a bidirectional inverter circuit, comprising:

a positive DC bus, a negative DC bus, M bidirectional switch networks and M AC buses, wherein M≥2;

the M bidirectional switch networks comprises m1 first type of bidirectional switch networks, m2 second type of bidirectional switch networks, and m3 third type of bidirectional switch networks, each of the m1 first type of bidirectional switch networks comprises an inverting coupling transformer, a filter inductor and a plurality of switch bridge arms, each of the m2 second type of bidirectional switch networks comprises a filter inductor and a switch bridge arm, each of the m3 third type of bidirectional switch networks comprises a switch bridge arm, wherein m1+m2+m3=M, and m1≥1;

in each of the m1 first type of bidirectional switch networks, positive DC ends of the plurality of switch bridge arms are respectively connected to the positive DC bus, negative DC ends of the plurality of switch bridge arms are respectively connected to the negative DC bus, and each bridge-arm midpoint of the plurality of switch bridge arms is respectively connected to one winding of the inverting coupling transformer, a midpoint of the inverting coupling transformer is connected to a first end of the filter inductor, and a second end of the filter inductor is connected to one of the M AC buses;

if m2≥1, in each of the m2 second type of bidirectional switch networks, a positive DC end, a negative DC end and a bridge-arm midpoint of the switch bridge arm are respectively connected to the positive DC bus, the negative DC bus and a first end of the filter inductor in a one-to-one correspondence, and a second end of the filter inductor is connected to one of the M AC buses; and if m3≥1, in each of the m3 third type of bidirectional switch networks, a positive DC end, a negative DC end and a bridge-arm midpoint of the switch bridge arm are respectively connected to the positive DC bus, the negative DC bus and one of the M AC buses in a one-to-one correspondence.

11. The bidirectional inverter according to claim 10, wherein the bidirectional inverter circuit further comprises:

a controller, respectively connected to the positive DC bus, the negative DC bus, the M AC buses and the M bidirectional switch networks, wherein the controller is configured to output corresponding driving voltages to the switch bridge arms according to a driving instruction and electrical sampling signals of the positive DC bus, the negative DC bus and the M AC buses, to drive the M bidirectional switch networks to perform a rectification conversion or an AC conversion, and correspondingly output an AC signal or a DC signal of a preset magnitude.

12. The bidirectional inverter according to claim 11, wherein the controller comprises:

a first voltage sampling circuit, connected to the positive DC bus and configured to perform a voltage sampling on the positive DC bus to generate a first voltage sampling signal;

a second voltage sampling circuit, connected to the M AC buses and configured to perform a voltage sampling on the M AC buses to generate a second voltage sampling signal;

a current sampling circuit, connected to the M AC buses and configured to perform a current sampling on the AC buses to generate a current sampling signal;

a first comparison circuit, respectively connected to the first voltage sampling circuit and the current sampling circuit, and configured to perform a comparison on the first voltage sampling signal and a first reference voltage signal, and to generate a first feedback signal according to a comparison result and the current sampling signal;

a second comparison circuit, respectively connected to the second voltage sampling circuit and the current sampling circuit, and configured to perform a comparison on the second voltage sampling signal and a second reference voltage signal, and to generate a second feedback signal according to a comparison result and the current sampling signal;

a gate circuit, respectively connected to the first comparison circuit and the second comparison circuit, and configured to generate a control signal according to the driving instruction, the first feedback signal and the second feedback signal;

a logic operation and wave-sending circuit, connected to the gate circuit, and configured to generate a pulse width modulation (PWM) driving signal according to the control signal; and a drive circuit, respectively connected to the logic operation and wave-sending circuit and the switch bridge arms of the M bidirectional switch networks, and configured to generate a driving voltage of a corresponding voltage magnitude to each of the switch bridge arms according to the PWM driving signal, so as to drive the M bidirectional switch networks to perform the rectification conversion or the AC conversion, and correspondingly output the AC signal or the DC signal of the preset magnitude.

13. The bidirectional inverter according to claim 10, wherein when m1≥3, each of m1 filter inductors is respectively connected to one of the M AC buses, and each of the m1 filter inductors is further connected to a midpoint of one inverting coupling transformer; or alternatively, the m1 filter inductors are divided into multiple groups and each of the multiple groups is respectively connected to one of the M AC buses, each group of filter inductors comprises at least one filter inductor, and the at least one filter inductor is connected to a same AC bus, each of the m1 filter inductors is further connected to the midpoint of one inverting coupling transformer.

14. The bidirectional inverter according to claim 10, wherein, in each of the m2 second type of bidirectional switch network or each of the m3 third type of bidirectional switch network, the switch bridge arm comprises two insulated gate bipolar transistors connected in series and two body diodes connected in anti-parallel to the two insulated gate bipolar transistors, respectively;

In each of the m3 third type of bidirectional switch network, the two insulated gate bipolar transistors are connected in series and connected between the positive DC bus and the negative DC bus, and a connection node of the two insulated gate bipolar transistors is connected to one of the M AC buses; or alternatively, in each of the m2 second type of bidirectional switch network, the two insulated gate bipolar transistors are connected in series and connected between the positive DC bus and the negative DC bus, and the connection node of the two insulated gate bipolar transistors is connected to the first end of the filter inductor, and the second end of the filter inductor is connected to one of the M AC buses.

15. The bidirectional inverter according to claim 10, wherein, in each of the m2 second type of bidirectional switch network or each of the m3 third type of bidirectional switch network, the switch bridge arm comprises two filter capacitors connected in series;

in each of the m3 third type of bidirectional switch network, the two filter capacitors are connected in series and connected between the positive DC bus and the negative DC bus, and a connection node of the two filter capacitors is connected to one of the M AC buses; or alternatively, in each of the m2 second type of bidirectional switch network, the two filter capacitors are connected in series and connected between the positive DC bus and the negative DC bus, the connection node of the two filter capacitors is connected to the first end of the filter inductor, and the second end of the filter inductor is connected to one of the M AC buses.

16. The bidirectional inverter according to claim 10, wherein the filter inductor is an equivalent leakage inductance of the inverting coupling transformer.

17. The bidirectional inverter according to claim 10, wherein when m1≥2;

a persistent current switch for following current is connected in parallel between the first ends of the m1 filter inductors of every two adjacent first type of bidirectional switch networks;

the persistent current switch comprises a first persistent current switch and a second persistent current switch connected in series, and two third body diodes connected in anti-parallel to the first persistent current switch and the second persistent current switch respectively.

18. The bidirectional inverter according to claim 10, wherein, the bidirectional inverter circuit adopts a modulation mode of phase-shifting interlaced phase $\Phi \neq 360°/N$, and in each of the m1 first type of bidirectional switch networks, driving signals received by upper and lower bridge arms of each switch bridge arm are at opposite levels and the switch bridge arm has a dead time of a preset size, and a conduction condition of the switch bridge arm is that:

$D>0.5$ and $\Phi<(1-D)$, or alternatively, $D<0.5$ and $\Phi<D$;

wherein, N represents a number of switch bridge arms in the first type of bidirectional switching network, D represents an operation duty cycle of the upper bridge arm or the lower bridge arm of each switch bridge arm, $\Phi$ represents an operation phase difference in each switch bridge arm, and the operation phase difference is greater than the dead time of each switch bridge arm.

* * * * *